Figure 1:
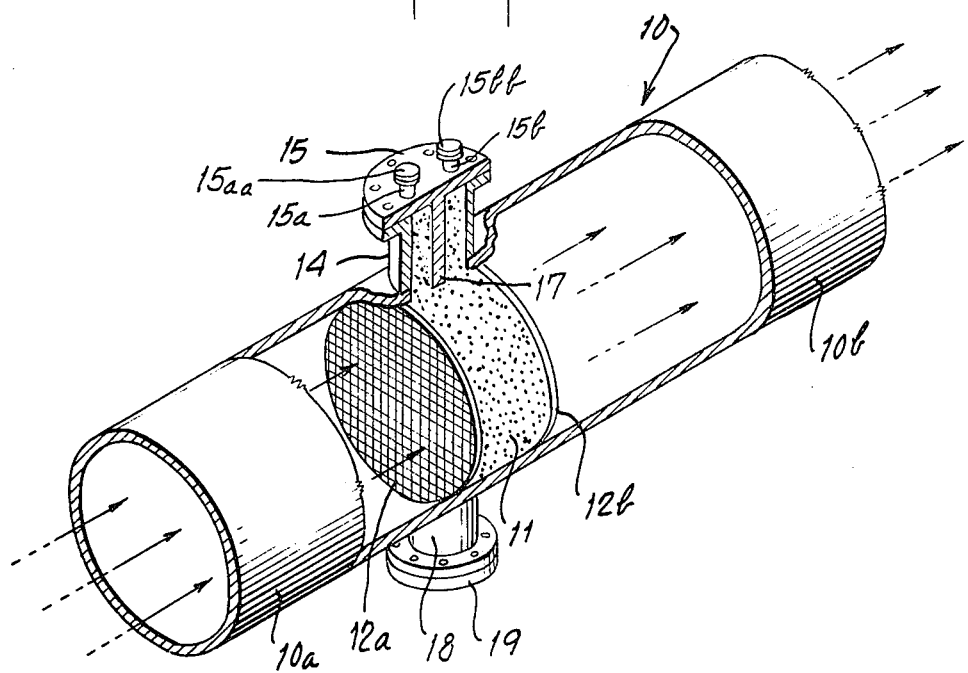

United States Patent [19]

Rogers

[11] 4,119,706

[45] Oct. 10, 1978

[54] METHOD OF CATALYTICALLY RECOMBINING RADIOLYTIC HYDROGEN AND RADIOLYTIC OXYGEN

[75] Inventor: William M. Rogers, Alameda, Calif.

[73] Assignee: Engelhard Minerals & Chemicals Corporation, Iselin, N.J.

[21] Appl. No.: 731,692

[22] Filed: Oct. 12, 1976

[51] Int. Cl.² .......................... B01D 53/34; C01B 5/00
[52] U.S. Cl. ..................................... 423/580; 423/219;
423/248; 176/16; 176/37; 422/159; 422/173;
422/177
[58] Field of Search ............... 423/210, 219, 248, 580;
176/37, 16; 23/288 R, 288 F, 288 E, 288 K,
288.3 F; 60/295

[56] References Cited

U.S. PATENT DOCUMENTS

| 2,112,335 | 3/1938 | Drennan | 23/288 R |
| 3,041,149 | 6/1962 | Houdry | 23/288 F |
| 3,307,920 | 3/1967 | Barnes | 23/288 F |
| 3,755,075 | 8/1973 | Henrie | 423/580 |
| 3,899,303 | 8/1975 | Gaysert | 23/288 F |
| 4,014,984 | 3/1977 | Parnes | 423/248 X |

FOREIGN PATENT DOCUMENTS 439,766  12/1935  United Kingdom ............... 23/288.3 F Primary Examiner—Earl C. Thomas

[57] ABSTRACT

A catalytic reactor useful for carrying out a catalytic reaction comprises a horizontally disposed reaction zone. Foraminous retaining means are disposed within said reactor or reaction zone transversely thereof and occupying the complete cross-section of said reaction zone available for the flow of gaseous or vaporized reactants therethrough. The foraminous retaining means define a transverse volume along a portion of the length of the reactor and are adapted to be filled with particle-form catalytic material. A chamber is disposed at the upper portion of and in open communication with said transverse volume. The chamber is adapted to be filled with particle-form catalytic material so as to maintain the transverse volume filled with particle-form catalytic material. The catalytic reactor is generally useful for carrying out catalytic reactions involving gaseous or vaporized reactants and a mass of particle-form catalytic material.

7 Claims, 2 Drawing Figures

METHOD OF CATALYTICALLY RECOMBINING RADIOLYTIC HYDROGEN AND RADIOLYTIC OXYGEN

This invention relates to a catalytic reactor and to a method of carrying out a catalytic reaction wherein gaseous or vaporized reactants are flowed into contact with a mass of particle-form catalytic material. In one embodiment, this invention is particularly useful as a catalytic recombiner for boiling water nuclear reactors wherein condenser off-gases are treated for recovery and eventual disposal or handling of the radioactive gases, such as xenon and krypton, contained in such off-gases.

Reactors useful for carrying out a catalytic reaction involving contact of gaseous or vaporized reactants with a mass of particle-form catalytic material are known. A wide variety of such reactors have been employed in the petroleum industry, including the petrochemical industry, and in the chemical industry, such as in the manufacture of sulfuric acid and ammonia. For the most part, however, the reactors known and employed heretofore have lacked versatility in the sense that specialized reactors have been developed for specific catalytic reactions. For example, reactors, sometimes known as catalytic recombiners, have been known for effecting the recombination or reaction of radiolytic hydrogen and radiolytic oxygen produced in boiling water nuclear reactors, see U.S. Pat. No. 2,943,921 (1960) and U.S. Pat. No. 3,859,053 (1975). Other reactors are known for the treatment of combustion gases resulting from the operation of an internal combustion engine, see U.S. Pat. No. 3,838,977 (1974). Structures, such as filters, have also been known for the treatment of gaseous streams containing particulate material, see U.S. Pat. No. 3,770,388 (1973). The disclosures of each of the above-identified patents are herein incorporated and made part of this disclosure.

It is an object of this invention to provide a versatile catalytic reactor having the capability of general employment in the petroleum, petro-chemical and chemical industries and also useful in other areas wherein it is desirable or necessary to bring gaseous or vaporized reactants into contact with a mass of particle-form catalytic material to effect a desired catalytic reaction.

It is another object of this invention to provide an improved method and apparatus for carrying out a catalytic reaction to assure that substantially all of the gaseous or vaporized reactants employed in the catalytic reaction are brought into contact with the catalytic material and to assure that substantial amounts, even very minor amounts, do not by-pass the catalytic material.

It is another object of this invention to provide a catalytic reactor, and method of employing same, particularly useful or suitable as a catalytic recombiner for use in connection with a boiling water nuclear reactor installation wherein condenser off-gases containing air, radiolytic hydrogen, radiolytic oxygen, and radioactive gases, such as radioactive xenon and krypton, are handled and treated in a manner to reduce the volume of such gases so that any residual, not readily condensible gases, such as leakage air and the radioactive gases, xenon and krypton, are more readily handled for disposal.

In at least one embodiment of the practices of this invention, at least one of the foregoing objects will be achieved. How these and other objects of this invention are achieved will become apparent in the light of the accompanying disclosure and drawings wherein FIG. 1 schematically illustrates a catalytic reactor in accordance with this invention for effecting contact and resulting catalytic chemical reaction between gaseous or vaporized reactants and a mass of particle-form catalytic material, and wherein FIG. 2 schematically illustrates a special embodiment of the practices of this invention useful as a catalytic recombiner for use in a boiling water nuclear reactor installation for the handling and treatment of radiolytic hydrogen and radiolytic oxygen containing condenser off-gases.

In accordance with this invention, there is provided a catalytic reactor useful for carrying out a chemical reaction wherein gaseous or vaporized reactants are flowed into contact with a substantially fixed or stabilized mass of particle-form catalytic material and wherein the reactor comprises or provides a horizontally disposed reaction zone adapted for the flow of the gaseous or vaporized reactants therethrough from one end of the reaction zone to the other end of the reaction zone. In the catalytic reactor in accordance with this invention, foraminous retaining means are provided or disposed within the reaction zone transversely thereof and accupying the complete cross-section of the reaction zone available for the flow of the gaseous or vaporized reactants therethrough along a length of the reaction zone. The foraminous retaining means thus disposed within the reaction zone provide a transverse volume or space along a length thereof, the transverse volume or space being adapted to be filled with particle-form catalytic material and easily emptied. As the gaseous or vaporized reactants come into contact with the particle-form catalytic material within the transverse zone or volume occupying the length of the reaction zone, the desired catalytic reaction takes place. Further, in accordance with this invention there is provided a chamber or fill pipe vertically disposed at the upper portion and integral with the reaction zone or reactor and in open communication at the bottom end thereof with the transverse volume or space defined by said foraminous means within the reaction zone, the vertically disposed chamber being closed at the upper end thereof. The vertically disposed chamber is adapted to be filled with particle-form catalytic material so as to maintain the transverse zone or space within the reaction zone filled with particle-form catalytic material so that as said gaseous or vaporized reactants flow through said reaction zone to the other end thereof, the gaseous or vaporized reactants come into contact with the particle-form catalytic material fully occupying the transverse volume or space within the reaction zone. The particle-form catalytic material substantially filling the vertically disposed chamber assures that the gaseous or vaporized reactants undergoing treatment and flowing through the reaction zone come into contact with particle-form catalytic material to effect the desired catalytic reaction.

Figure 2:
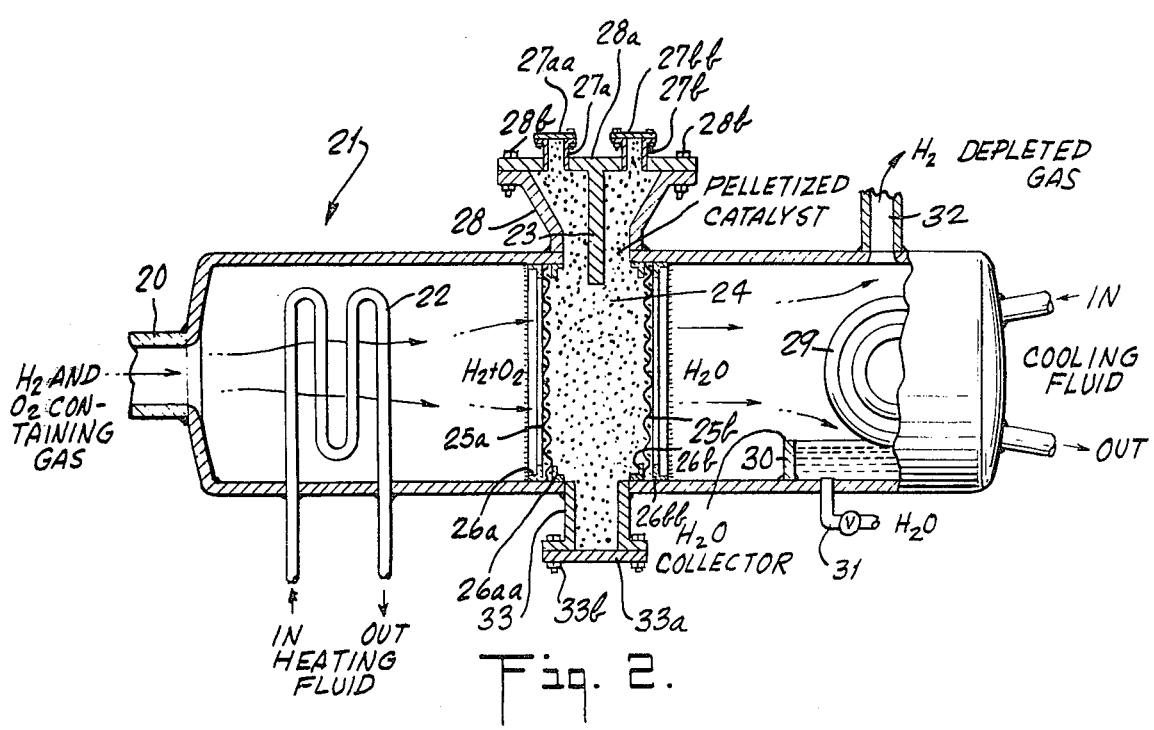

In the mode of operation of a method in accordance with the practices of this invention and as illustrated in FIG. 1 of the drawings, catalytic chemical reaction between gaseous or vaporized reactants involving a mass of particle-form catalytic material useful for carrying out the desired chemical reaction is effected by bringing the gaseous or vaporized reactants into contact with a mass of particle-form catalytic material provided within a horizontally disposed reaction zone or reactor. The mass of particle-form catalytic material is provided within the reaction zone so as to occupy the complete cross-section of a length of the reaction zone, while maintaining the mass of particle-form catalytic material therein so as to substantially fill or occupy the complete cross-section of said length of the reaction zone whereby gaseous or vaporized reactants flowing through said horizontally disposed reaction zone from one end thereof to the other end thereof come into contact with the mass of particle-form catalytic material and short-circuiting or channeling of the gaseous or vaporized reactants through the mass of particle-form catalytic material is substantially avoided. By employing the reactor in accordance with this invention, equal and/or a fixed contact time of the reactants with the catalytic material can be controlled and/or assured.

For a better and more complete understanding of the practices of this invention, both in the apparatus and the method embodiment, reference is now made to FIG. 1 of the drawings which schematically illustrates a horizontally disposed catalytic reactor, generally indicated by reference numeral 10, in accordance with this invention. As illustrated in FIG. 1, gaseous or vaporized reactants from a suitable source, not shown, flow from one end 10a of the reaction zone or reactor towards the other end 10b of the reaction zone or reactor. As the gaseous or vaporized reactants flow through reactor 10, the gaseous or vaporized reactants come into contact with mass 11 of particle-form catalytic material. Mass 11 of particle-form catalytic material is maintained and substantially fixed within reactor 10 by foraminous retaining means 12a and 12b. Foraminous retaining means 12a is fixed and maintained within reactor 10 on the upstream side of mass 11 of catalytic material in the direction of flow of the gaseous reactant therethrough and foraminous means 12b is fixed and maintained within reactor 10 on the downstream side of mass 11 of catalytic material in the direction of flow of the gaseous or vaporized reactants therethrough. Foraminous means 12a and 12b maintain and support mass 11 of catalytic material within reactor 10 along a specified length thereof such that mass 11 of catalytic material occupies the complete cross-section of reactor 10 along the length thereof defined by the distance between foraminous means 12a and foraminous means 12b. As illustrated, foraminous means 12a and 12b are disposed transversely with respect to the interior of reactor 10 such that the gaseous or vaporized reactants flowing through reactor 10 from one end 10a to the other end 10b thereof come into contact and perpendicularly impinge foraminous means 12a and exit after contact with mass 11 of catalytic material perpendicularly in a downstream direction from foraminous retaining means 12b.

Mass 11 of particle-form catalytic material is maintained substantially occupying the complete cross-section of catalytic reactor 10 along the length thereof by providing a chamber or fill pipe 14 integral with the upper portion of reactor 10, as illustrated. Vertical chamber or fill pipe 14 is open, as indicated, at the bottom end thereof and is closed or sealed at the upper end thereof by cover 15.

Chamber or fill pipe 14 and cover 15 thereof are provided with at least two fill pipes, 15a and 15b, each provided with covers 15aa and 15bb, respectively, for the loading or addition of particle-form catalytic material into mass 11 and to provide means for loading or filling pipe 14 with catalytic material. Also, as illustrated in FIG. 1, baffle plate 17 is fixed to the underside of cover 15 and extends downwardly into chamber or fill pipe 14 and partially into the mass 11 of the particle-form catalytic material within reactor 10. Baffle 17 having a width equal to or slightly less than the inside diameter of fill pipe 14 is employed to prevent the gaseous or vaporized reactants undergoing treatment within the reactor 10 from bypassing the particle-form catalytic material of mass 11 within reactor 10. Bypassing might occur if the amount or level of particle-form catalytic material within chamber or fill pipe 14 drops due to settling, contraction, attrition and other reasons such that fill pipe 14 is emptied. As illustrated, fill pipes 15a and 15b are provided on cover 15 to fill pipe 14 with the particle-form catalytic material. Fill pipes 15a and 15b are provided to supply the catalytic material to both sides of baffle 17 within chamber or fill pipe 14. Desirably, discharge pipe 18 is also provided for direct access to the bottom of mass 11 of the particle-form catalytic material. Discharge pipe 18 provided with cover 19 fixed thereto is useful for the discharging and emptying of mass 11 of catalytic material from reactor 10 when the activity of the catalytic material has become sufficiently depleted.

With mass 11 of particle-form catalytic material occupying the transverse space within reactor 10 defined by foraminous retaining means 12a and 12b and with particle-form catalytic material filling chamber or fill pipe 14, the operator of catalytic reactor 10 is assured that the gaseous and/or vaporized reactants flowing through reactor 10 from one end 10a to the other end 10b must come into contact with and pass through mass 11 of particle-form catalytic material. The catalytic material occupying or filling chamber or fill pipe 14, as indicated herein, serves as a reservoir to supply whole or substantially fresh particle-form catalytic material to mass 11 occupying the complete cross-section of reactor 10 along a length thereof so as to assure, if not guarantee, that any catalytic material lost due to physical breakdown, dusting or decrepitation is made up by substantially fresh catalytic material supplied from chamber or fill pipe 14 and to compensate for changes in volume of mass 11 caused by thermal expansion and contraction of vessel or reactor 10, thereby maintaining the entire cross-section of reactor 10 defined between retaining means 12a and 12b filled with mass 11 of particle-form catalytic material and making certain that the gaseous or vaporized reactants flowing through reactor 10 come into contact with the particle-form catalytic material, and channeling or by-passing of the catalytic material is avoided.

As illustrated in FIG. 1, vertical chamber or fill pipe 14 positioned along the upper portion of reactor 10 is integral with reactor 10 with the bottom end thereof being in open communication with mass 11 of particle-form catalytic material. The size of chamber or fill pipe 14 should be such as to provide a volume of particle-form catalytic material therein to assure that there is an adequate reservoir of the particle-form catalytic material to compensate for thermal expansion and contraction of reactor 10.

Foraminous means 12a and 12b, particularly the openings therethrough, are sized so as to retain mass 11 of particle-form catalytic material therebetween and to prevent the loss of any particle-form catalytic material through the openings, save such pieces or fragments or dust of the particle-form catalytic material which occur due to physical breakdown and/or decrepitation of the particle-form catalytic material during use and which might be caused by an unequal expansion and/or contraction of the reactor 10 including foraminous means 12a and 12b and other elements thereof, due to start-up or shut-down or variations in temperature during the operation of reactor 10. It should be particularly noted that access to mass 11 of the particle-form catalytic material within reactor 10 is through bottom catalyst unloading pipe 18 or chamber or fill pipe 14. Before use, sufficient particle-form catalytic material would be supplied to the space or volume defined within reactor 10 by foraminous means 12a and 12b to provide mass 11 so as to occupy the complete cross-section of reactor 10 between foraminous means 12a and 12b and with an amount filling chamber or fill pipe 14 as a reservoir.

Further, as illustrated in FIG. 1, foraminous retaining means 12a and 12b are disposed transversely within reactor 10 such that the gaseous or vaporized reactants impinge perpendicularly thereon for substantially transverse perpendicular flow with respect thereto through reactor 10. Foraminous means 12a and 12b are planar in shape and are uniformly spaced apart within reactor 10, thereby providing mass 11 of particle-form catalytic material of uniform thickness or travel with respect to the gaseous or vaporized reactants flowing therethrough.

Although FIG. 1 shows mass 11 of particle-form catalytic material being contained and maintained between two foraminous means or screens 12a and 12b, a plurality, i.e. more than two, of foraminous means may be employed with corresponding fill pipes so as to provide layered masses of particle-form material, either the same catalytic material or different catalytic material, if different reactions are desired to be accomplished within reactor 10. Indeed, one or more masses 11 of particle-form catalytic material might be employed, each separate from the other with corresponding and acompanying chambers and fill pipes and discharge pipes to provide additional masses of catalytic material to perform the same function or reaction. When separate multiple masses of particle-form catalytic material are employed, as indicated, different catalytic material may be employed, if desired, depending upon the catalytic reactions desired to be accomplished and/or the sequence of the reactions to be carried out within reactor 10.

Reference is now made to FIG. 2 of the drawings which illustrates a special embodiment of the invention as a catalytic recombiner, such as a catalytic recombiner useful in boiling water nuclear reactor installations for carrying out the catalytic chemical reaction between radiolytic hydrogen and radiolytic oxygen, produced during the operation of a boiling water nuclear reactor, to yield water or water vapor. A description of the installation and operation of a catalytic recombiner for use in connection with boiling water nuclear reactors is set forth in the publication *Nuclear Engineering International*, September 1973, in the article entitled "Catalytic Recombiners for Boiling Water Reactors" by W. M. Rogers and R. H. Lechelt. The disclosures of this article and publication are herein incorporated and made part of this disclosure.

In the above-referred article it is disclosed that in the operation of boiling water nuclear reactors for the production of steam which is used to drive a steam turbine for the production of electricity, the steam issuing from the steam turbine is passed to a condenser. The resulting condensed water is returned to the boiling water nuclear reactor. The gaseous non-condensibles from the condenser comprising, by way of example, steam in an amount of about 79% by volume, radiolytic hydrogen about 12% by volume, radiolytic oxygen about 6% by volume, air leakage about 3% by volume and trace amounts of radioactive xenon and krypton, which usually escape through minor imperfections in the nuclear fuel cladding, are then diluted by the addition of steam to yield a gaseous or vaporous admixture comprising at least about 93% by volume steam, less than 4% by volume radiolytic hydrogen, less than 2% by volume radiolytic oxygen and less than about 1% by volume leakage air, with trace amounts of radioactive xenon and krypton.

This gaseous vaporous admixture is then heated to above its saturation temperature prior to contact with a catalyst for the catalytic chemical conversion of the radiolytic hydrogen and radiolytic oxygen to water. Upon completion of the catalytic chemical reaction, there is recovered a gaseous effluent at an elevated temperature, usually about 800° F., since the catalytic conversion operation is exothermic, analyzing on a wet basis about 99% water as steam, about 1% air, about 4 ppm radiolytic hydrogen, about 2 ppm radiolytic oxygen and trace amounts of radioactive xenon and krypton. When this reactor or recombiner effluent is cooled to condense water therefrom, the resulting gaseous or vaporous effluent analyzes on a dry basis less than 0.1%-1% hydrogen, greater than about 95% air, the balance being water vapor, with trace amounts of radioactive xenon and krypton. By thus treating the non-readily condensible off gases from the condenser, i.e. by reacting the radiolytic hydrogen and oxygen therein by contact with a suitable platinum group metal catalyst, such as a platinum metal on alumina, and by condensing the resulting effluent from the catalytic reactor the volume of the gases to be treated for the subsequent handling and disposal of the radioactive gaseous components therein, viz. the radioactive xenon and krypton, is very substantially reduced so that the eventual handling and disposal of these radioactive gases, xenon and krypton, is greatly facilitated.

Instead of employing steam as the diluent for admixture with the condenser off gases before passing the resulting gaseous admixture to the catalytic reactor or recombiner, an inert gaseous diluent, such as nitrogen, could be employed. In order to substantially reduce the volume of gases handled, the nitrogen diluent must come from recycling the recombiner effluent, and hydrogen must be added to react with all the oxygen in the air so that only $N_2$ is remaining from the air. If nitrogen from any other source is added, the volume of gas is increased rather than reduced. If $H_2$ is not added, the recycled diluent gas is then air which is acceptable.

When employing gaseous nitrogen as the diluent, sufficient gaseous nitrogen would be employed to yield a diluted gaseous admixture comprising about greater than 93% nitrogen including steam, less than about 4% radiolytic hydrogen and less than 2% radiolytic oxygen and less than about 1% air, with trace amounts of radioactive xenon and krypton. The resulting diluted gaseous admixture would then be preheated to about 200°–400° F. and reacted in a catalytic recombiner in accordance with the practice of this invention to produce a gaseous effluent at a temperature of about 800°–900° F. analyzing on a wet basis less than 960 ppm radiolytic hydrogen, less than about 480 ppm radiolytic oxygen, about 4% $H_2O$, about 95% gaseous diluent, about 1% air and trace amounts of radioactive xenon and krypton. Upon cooling for the removal of water, the resulting gaseous effluent would analyze about less than 0.1% (1000 ppm) to 1% (10,000 ppm) radiolytic hydrogen, less than about 0.05% (500 ppm) to 0.5% (5000 ppm) radiolytic oxygen, a small amount of water sufficient to saturate the effluent and gaseous (nitrogen) diluent greater than about 95%, with the balance being air.

It is seen that in the special practice of this invention wherein the reactor is employed as a catalytic recombiner for the handling of the non-readily condensible off gases from the main condenser of a steam turbine boiling water nuclear reactor, the practice of this invention results in a substantial reduction of the volume of the radioactive xenon and krypton-containing gases to be handled since the initial radiolytic hydrogen and oxygen components thereof are recombined to form water which is then readily condensed and removed, leaving behind an effluent of substantially smaller volume and comprising essentially leakage air, sufficient steam for saturation and the original radioactive gases, xenon and krypton, now present at a substantially greater concentration.

Reference is now made to FIG. 2 of the drawings which illustrates the above-described special embodiment of the practice of this invention involving the use of the reactor as a catalytic recombiner in a boiling water nuclear reactor installation for the handling and treatment of the non-readily condensible off gases.

As illustrated in FIG. 2, radiolytic hydrogen and radiolytic oxygen-containing condenser off gases are supplied via conduit 20 to reactor or catalytic recombiner, generally indicated by reference numeral 21. As illustrated, conduit 20 is integral with reactor or recombiner 21 by welding or similarly joining conduit 20 to reactor 21. Upon entering reactor 21, the hydrogen and oxygen-containing gases are preheated to a suitable temperature, above saturation, such as a temperature in the range 200°–400° F., e.g. 300° F., by contact with heat exchange means 22 disposed internally of and integral with reactor 21 and provided with heating fluid or electrical heat, as illustrated. The resulting preheated gases come into contact with and pass through a porous permeable mass 24 of particle-form or pelletized catalyst, such as a catalyst comprising a minor amount of platinum group metal, deposited upon a suitable substrate, such as alumina. The catalyst making up mass 24 is effective for carrying out the catalytic reaction of the gaseous hydrogen and gaseous oxygen to yield water vapor or $H_2O$.

Mass 24 of the pelletized platinum-group-metal-containing catalyst is maintained within reactor 21 to occupy a length of the complete cross-section thereof by foraminous means 25a and 25b which are held in position, respectively, by peripheral flanges 26a, 26aa and 26b and 26bb, respectively.

In accordance with the practice of this invention there is provided chamber or fill pipe 28 disposed in the upper portion of reactor 21 and integral therewith, as illustrated, which contains a mass of particle-form or pelletized catalyst. The additional mass of particle-form or pelletized catalyst within chamber or fill pipe 28 which is open at the bottom thereof and in direct communication with mass 24 of the catalyst serves to maintain the complete cross-section of reactor 21 within the volume defined by foraminous retaining means or screens 25a and 25b completely filled with catalyst. Chamber or fill pipe 28, as illustrated, is closed by cover 28a and bolts 28b.

Further, as illustrated in FIG. 2, cover 28a is provided with fill pipes 27a and 27b which are disposed on each side of baffle plate 23 affixed to the underside of cover 28a and extending downwardly into chamber or fill pipe 28 into mass 24 of the particle-form catalytic material. Fill pipes 27a and 27b, which are closed with covers 27aa and 27bb, respectively, serve to provide means for the supply of the particle-form catalytic material to reactor 21 to make up catalytic mass 24. Further, as illustrated, discharge pipe 33 is provided in communication with the bottom of mass 24 of particle-form catalytic material within reactor 21 for the discharge of the catalytic material making up mass 24 when desired, such as when its catalytic activity has been depleted. In this instance, over 33a pipe 33 would be removed upon removal of nuts 33b to permit discharge of mass 24 of catalytic material from reactor 21 via discharge pipe 33.

The gaseous effluent issuing after contact with the amount of catalytic mass 24 at an elevated temperature of about 800°–950° F., depending on $H_2$ and $O_2$ reacted, containing water vapor derived from the radiolytic hydrogen and radiolytic oxygen and now having a very substantially reduced content of hydrogen and oxygen, is passed into contact with heat exchange means 29 provided within the interior of reactor 21 and supplied with suitable cooling fluid, as indicated. Upon contact with cooling heat exchange means 29, the water vapor-containing gaseous effluent is cooled to condense therefrom the water vapor as liquid water which is collected in internal reservoir or collector 30 provided within and integral with reactor 21. The water is withdrawn therefrom for disposal via valved line 31. The remaining non-readily condensible gases, substantially saturated with water vapor and containing only small or trace amounts of radiolytic hydrogen and radiolytic oxygen, are recovered from reactor 21 via outlet line 32 for subsequent treatment and disposal of the radioactive gases xenon and krypton therein.

FIG. 2, as described hereinabove, illustrates a special embodiment of the practices of this invention involving the use of the reactor as a catalytic recombiner in a boiling water nuclear reactor installation for the handling and treatment of the radiolytic hydrogen and oxygen produced during the operation of the boiling water reactor so that these gases, hydrogen and oxygen, are reacted to produce water which is readily condensed and removed to yield residual gaseous effluent, now having a substantially higher concentration of the radioactive gases, xenon and krypton, and a smaller volume of such residual gases, such that these gases are now more readily and conveniently handled for disposal.

In the practice of this invention the catalytic reactor may be employed at a suitable temperature necessary or desirable for carrying out the desired chemical reaction. The reactor of this invention may be employed at a subatmospheric, atmospheric or superatmospheric pressure, such as at an elevated pressure in the range about 0–1500 psig, more or less. Further, as indicated herein, substantially any particle-form catalyst appropriate for the reaction to be carried out within the reactor may be employed. When employed as a catalytic recombiner for the catalytic conversion of radiolytic hydrogen and radiolytic oxygen to water, it is preferred to employ a platinum-group-metal-containing-catalyst.

As will be apparent to those skilled in the art in the light of the foregoing disclosure, many modifications, alterations and substitutions are possible in the practice of this invention without departing from the spirit or scope thereof.

I claim:

1. A method of treating the condenser off-gases of a boiling water nuclear reactor wherein said off-gases contain a major amount of steam or water vapor and minor amounts of radiolytic hydrogen and radiolytic oxygen together with minor amounts of air and radioactive gases which comprises introducing said off-gases into contact with a mass of particle-form catalytic material disposed within a reaction zone, said mass of particle-form catalytic material occupying the complete cross-section of a length of said reaction zone, said particle-form catalytic material effecting the catalytic reaction of hydrogen and oxygen to produce water vapor, maintaining said mass of particle-form catalytic material substantially filling or occupying the complete cross-section of said reaction zone along a length of said reaction zone by maintaining a reservoir of said particle-form catalytic material above said reaction zone and in open communication therewith so that as said particle-form catalytic material becomes depleted from or otherwise leaves said reaction zone additional particle-form catalytic material moves or falls by gravity via at least two substantially independent flowpaths into said reaction zone to maintain said reaction zone completely filled with said particle-form catalytic material and cooling the resulting reaction product gases, now substantially depleted with respect to hydrogen and oxygen.

2. A method in accordance with claim 1 wherein steam or water vapor as a diluent is added to said off-gases before said off-gases are brought into contact with said mass of particle-form catalytic material, the amount of steam or water vapor thus introduced into said off-gases being sufficient to reduce the hydrogen content of said off-gases below about 4% by volume.

3. A method in accordance with claim 1 wherein air or an inert gas as a gaseous diluent is added to said off-gases before said off-gases are brought into contact with said mass of particle-form catalytic material, the amount of said gaseous diluent thus introduced into said off-gases being sufficient to reduce the hydrogen content of said off-gases below about 4% by volume.

4. A method in accordance with claim 1 wherein said off-gases are heated to a temperature in the range about 200°–400° F. before being introduced into contact with said mass of particle-form catalytic material.

5. A method in accordance with claim 1 wherein said off-gases are heated to a temperature in the range about 300° F. before being introduced into contact with said mass of particle-form catalytic material.

6. A method in accordance with claim 1 wherein said off-gases are contacted with said mass of particle-form catalytic material at an elevated pressure in the range from about 0 psig to about 1500 psig.

7. A method in accordance with claim 1 wherein said off-gases are heated to a temperature in the range 200°–400° F. before contact with said catalytic material and wherein said catalytic material contains a catalytically effective amount of platinum group metal.

* * * * *